United States Patent Office 3,429,949
Patented Feb. 25, 1969

---

3,429,949
UNSATURATED POLYESTERS PREPARED FROM
α,α'-DIMETHYL MUCONIC ACIDS
Gary L. Driscoll, Boothwyn, Pa., assignor to Sun Oil
Company, Philadelphia, Pa., a corporation of New
Jersey
No Drawing. Continuation-in-part of application Ser. No.
565,103, July 14, 1966. This application Aug. 25, 1966,
Ser. No. 574,939
U.S. Cl. 260—861                            14 Claims
Int. Cl. C08f 21/00; C08g 17/10; C07c 69/52

ABSTRACT OF THE DISCLOSURE

Curable polyesters of relatively low mold shrinkage when crosslinked with an ethylenically unsaturated monomer are prepared using α,α'-dimethyl muconic acids or dibasic materials derived therefrom as the unsaturated acid component of the polyester.

---

This application is a continuation-in-part of Ser. No. 565,103 filed July 14, 1966, and now abandoned.

The present invention relates to novel polyesters prepared from an unsaturated acid and a diol. More particularly, the invention relates to the curable polyesters of α,α'-dimethylmuconic acid alone or in admixture with other organic diacids and a suitable diol.

Background of the invention

There are three geometric isomers of α,α'-dimethylmuconic acid.

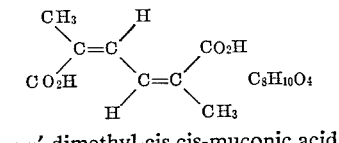

α,α'-dimethyl-cis,cis-muconic acid

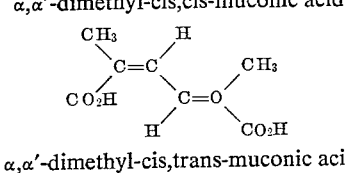

α,α'-dimethyl-cis,trans-muconic acid

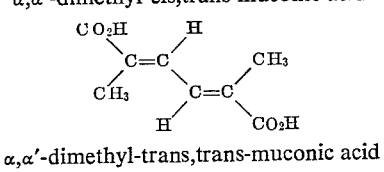

α,α'-dimethyl-trans,trans-muconic acid

These isomers are known in the art and the method for their production is shown in Elvidge et al., Journal Chemical Society, 1952, pp. 1026–33. The method employed was the peracetic acid oxidation of p-xylenol to produce the cis,cis isomer. The cis,cis isomer is inverted by boiling alkali to the trans,trans isomer. The cis,trans acid was produced by treatment with methanolic sodium methoxide.

An alternative method for producing the α,α'-dimethyl-cis,cis-muconic acid is disclosed in copending application Ser. No. 509,621, Raymond et al., filed Nov. 24, 1965, which discloses a microbiological oxidation of alkyl benzenes. The cis,cis isomer is produced by a particular strain of microorganisms of genus Nocardia, more particularly Nocardia coralline, a culture of which has been deposited with the American Type Culture Collection, Washington, D.C., under the number ATCC 19,070. This isomer can readily be isomerized to the cis-trans isomer or the trans,trans isomer under appropriate isomerization conditions.

The three isomeric dimethylmuconic acids are white crystalline powders with the following physical properties:

TABLE I

| | Cis,cis | Cis,trans | Trans,trans |
|---|---|---|---|
| Molecular wt | 170.2 | 170.2 | 170.2 |
| Melting Pt. ° C | [1] 223–224 | [1] 179.180 | 332–333 |
| Ionization constants (and 25° C.) | | | |
| $pK_1$ | 3.37 | 3.65 | ---------- |
| $\%pK_2$ | 4.73 | 5.20 | ---------- |
| Solubility, g./100 g. solution 25.0° C. | | | |
| water | 0.026 | 0.244 | 0.0036 |
| Water | [2] 0.24 | [2] 1.97 | [2] 0.032 |
| Ethyl alcohol | 3.30 | 22.7 | 0.39 |
| Ethyl acetate | 0.185 | 2.17 | 0.028 |
| Acetone | 0.994 | 7.60 | 0.112 |
| Benzene | 0.006 | 0.023 | 0.008 |
| Spectra: U.V., visible max., $(CH_3OH)$ | 273 | 278 | 282 |

[1] M.P. varies with the rate of heating.
[2] At 80° C.

Description of the invention

The present invention relates to linear interpolyesters comprising an organic diacid component selected from the group consisting of α,α'-dimethyl-cis,cis-muconic acid, α,α'-dimethyl-cis,trans-muconic acid, α,α'-dimethyl-trans,trans-muconic acid and mixtures thereof with each other and with an organic diacid of the structure

where R' is a bivalent organic radical and a diol component selected from the group consisting of a single diol and a mixture of diols having the structure HO—R''—OH where R'' is a bivalent organic radical.

The procedure preferably employed in producing the present polyesters has been a melt transesterification. Other procedures, however, such as inert solution polymerization and pyridine polymerization using the acyl halides and the anhydrides of the acids or the diacids can be employed with satisfactory results.

The reaction of cis,cis, cis,trans or trans,trans α,α'-dimethylmuconic acid with symmetrical diacids and diols produces linear polyesters having a high degree of crystallinity. Such symmetrical reactants include, for example, terephthalic acid and ethylene glycol. When the coreactants of the dimethylmuconic acid are unsymmetrical then the resulting linear polyesters are essentially noncrystalline, that is essentially amorphous. Such unsymmetrical reactants include ortho-phthalic acid and 1,2-propanediol.

Generally a stoichiometric ratio of diacid component to diol component will be employed, although it is sometimes desirable to use an excess of the diol component since some of the diol is often lost during the polymerization procedure.

When an organic diacid,

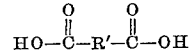

is used in addition to the dimethylmuconic acid, the mole ratio of dimethylmuconic acid to

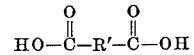

is generally in the range of 1:100 to 100:1, preferably 1:10 to 10:1.

Previously it has been possible to produce polyesters with unsaturation present in the acid portion thereof, for example, by the using of maleic or fumaric acid. However, the present polyesters need contain only one half the molar concentration of unsaturated acid as a polyester from maleic or fumaric acid in order to have the same number of crosslinking sites. This is a substantial advantage where, for example, it is desirable to use less costly acids such as adipic or it is desirable to have crosslinking sites but in a polyester having properties similar to Dacron for example wherein terephthalic acid can be employed in a high molar ratio to α,α'-dimethylmuconic acid.

From the other point of view the present polyesters will contain twice the available crosslinking sites as a polyester containing the same molar percent of maleic or fumaric acid. This is, of course, desirable since in any curing not all of the sites available for crosslinking will in fact crosslink. Thus, the instant polyesters will produce a greater degree of crosslinking than was previously possible for any particular molar concentration of monounsaturated diacid therein.

The organic diacid is characterized by the formula

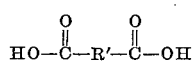

wherein R', the bivalent radical can be selected from the following groups: aromatic, aliphatic, cycloaliphatic, combination of aromatic and aliphatic, heterocyclic, bridged organic radicals wherein the bridge is oxygen, nitrogen or sulfur and substituted groups thereof. Such substituents include halogen, amino, methoxy, sulfide and the like provided that such substituents do not interfere with the polyesterification. The preferred R' group is a radical having 1 to 20 carbon atoms selected from the group consisting of alkylene, cycloalkylene and arylene. No ethylenic unsaturation is present in the R' group.

In carrying out the esterifications, the diacids

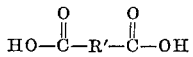

will usually be employed in the diester form as pointed out above. The organic diacid can be, for example, the acid form, the dimethyl and diethyl esters, the dioyl chlorides or the anhydrides of the following acids: adipic; pimelic; suberic; azelaic; sebacic; undecanedioic; dodecanedioic; malonic; succinic; glutaric; cyclopentane dicarboxylic; cyclohexane dicarboxylic; decalin dicarboxylic; orthophthalic; isophthalic; terephthalic; 1,2,2-trimethyl-1,3-cyclopentane dicarboxylic; bromopropanedioic; 3-methyl-1,1-butanedicarboxylic; mesoxalic; 4,6-dimethylisophthalic; l-glutamic; 2,6-naphthalene dicarboxylic; o,o'-azobenzenedicarboxylic; p,p'-azobenzenedicarboxylic; o,o'-azoxydibenzoic; p,p'-benzophenone dicarboxylic; 2,3-dihydroterephthalic; 1-3,3'-dithiobis(2-amino-propanoic); 2,5-furandicarboxylic; oxydiethanoic; 3,5-pyridinedicarboxylic; α-2-toluenedicarboxylic; tetrachlorophthalic; quinolinic; α-amino-succinic; tartronic; benzyl-tartronic; 2,3-thiophenedicarboxylic; isohemipinic and the like.

The selection of a particular diacid,

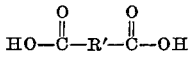

and the mole raio to be employed will depend on the desired properties of the final polyester.

The diol is characterized by the formula HO—R''—OH where R'', the bivalent radical can be selected from the following groups: aromatic, aliphatic, cycloaliphatic, combination of aromatic and aliphatic, heterocyclic, bridged organic radicals wherein the bridge is oxygen, nitrogen or sulfur and substituted groups thereof. Such substituents include amino, ketone, methoxy, halogen and the like provided that the substituents do not interfere in the polyesterifications. The preferred R'' is a radical having 2 to 20 carbon atoms selected from the group consisting of alkylene, cycloalkylene, arylene, combinations of arylene, alkylene and

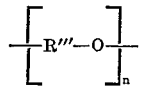

wherein R''' is an alkylene radical having 2 to 4 carbon atoms and n is an integer of from 1 to 6. A still more preferred R'' is a radical having 2 to 10 carbon atoms selected from the group consisting of alkylene, cycloalkylene, arylene,

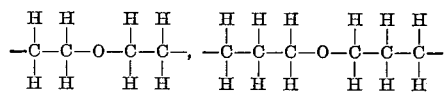

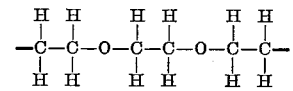

and

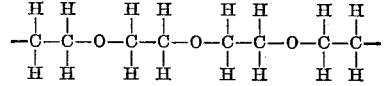

The diol component contains no ethylenic unsaturation.

Suitable diols for producing the present polyesters include ethylene glycol; trimethyl glycol; 1,4-butanediol; 1,4-pentanediol; 1,6-hexanediol; 1,7-heptanediol; 1,8-octanediol; 2,2-diethyl-1,3-propanediol; 1,2-propanediol; 2-ethyl-2-n-butyl-1,3-propanediol; diethylene glycol; triethylene glycol; tetraethylene glycol; dipropylene glycol; cyclohexanediol; hydroquinone; isopropylidene-bis-phenyl; α,3-toluenediol; 2,4-dihydroxy toluene; 1,3-dihydroxy-4-ethyl-benzene; 2,5-p-cymenediol; α,α'-p-xylenediol; α,5-m-xylenediol; 2,6-naphthalenediol; 1,2-anthracenediol; 3,4-phenanthrene diol; 1,1-bis-2-naphthol; 1,1,2,2-tetraphenyl-1,2-ethanediol; 3,3'-dihydroxy-biphenyl; 2,3-diphenyl-1,2-butanediol; 4-methylpyrocatechol; 2,2,2-tribromo-1,1-ethanediol; 2,2,3-trichloro-1,1-butanediol; 2,2,2-trichloro-1,1-ethanediol; 2-bromo-1,4-benzenediol; α-nitroalizarin; 6-amino-5-triazine-2,4-diol; 2,2'-dihydroxyazobenzene, diethanolamine; dipropanolamine; 2,2'-ethylimino-diethanol; 2-amino-2-ethyl-1,3-propanediol; 2,6-pyridinediol; 1-1-p-menthene-6,8-diol; isonaphthazarin; 1,2-dihydroxyanthraquinone; 2,7-dihydroxyanthraquinone; 2,4-dihydroxybenzophenone; 3-(4-hydroxy-3-methoxyphenyl)-2-propen-1-ol; 4,4'-dihydroxy-3,3'-5,5'-tetramethyoxybiphenyl; 1,3-dihydroxy-2-propanone; 2,2'-thiodiethanol and the like.

Preferred diols are ethylene glycol; diethylene glycol; 1,3-propanediol; 1,2-propanediol and mixtures thereof.

The polyesters of the present invention have inherent viscosities in the range of .05 to 2.0. The inherent viscosity is indicative of the degree of polymerization and is used herein as a measure thereof. Inherent viscosity is represented by the equation:

$$\eta\text{inherent} = \ln\frac{\eta\text{relative}}{C}$$

where $$\eta\text{relative} = \frac{t}{t_0}$$

$t_0$ = flow time through a viscometer of a liquid reference.
$t$ = flow time through the same viscometer of a dilute solution of polymer in the reference liquid.
$C$ = concentration of polymer in solution expressed in grams/deciliter.

The crystalline curable polyesters of the present invention are of particular significance since they can be made into strong fiber or cord. The fiber and cords can be used in the usual manner for reinforcing and producing synthetic textiles, carpet piles and the like. More particularly, the cord can be employed in tire construction in much the same manner as nylon or rayon cord but with the important advantage that the cord is crosslinked with the rubber during curing to provide greater tire strength. In a similar manner, the crystalline polyester can be extruded as film or molded into shapes which can be subsequently crosslinked.

The noncrystalline, i.e., essentially amorphous curable polyesters can be employed to form fibers, cord, film and shaped objects which when crosslinked have very good physical properties in regard to tensile strength and impact strength.

In addition to the crosslinking described above, the linear polyesters of the invention can be dissolved in a crosslinking agent such as styrene, cast in the desired form, then cured. The linear polyesters of the invention can also be crosslinked with themselves without any additional crosslinking agent. Suitable crosslinking agents include styrene, butadiene, methyl methacrylate, vinylacetate, acrylonitrile, vinylidene chloride, isoprene, and the like. Either conventional hot or cold curing procedures can be used.

The curable polyesters as described above are dissolved in the crosslinking agent by heating to a temperature in the range of 40° to 100° C. The blending can take place in the presence of a small amount of a polymerization inhibitor such as hydroquinone or 2,6-di-t-butylphenol to prevent premature crosslinking.

In handling the curable polyesters of the invention as in the production of films, fiber, cord, molded articles or blends with crosslinking agents the temperature of the polyesters should be kept below 220° C. At 220° C. the curable polyester will begin crosslinking with itself by a free radial mechanism. Up to 15 moles of crosslinking agent per mole of unsaturation can be employed, preferably a mole ratio in the range of 1:5 to 5:1 is employed.

After blending, the mixture can be hot cured at a temperature in the range of 50 to 150° C. for .5 to 10 hours or cold cured at a temperature of 20 to 50° C. for .5 to 10 hours. Generally, catalyst are employed for example, benzoyl peroxide in hot cures, and methyl ethyl ketone peroxide in dimethyl phthalate for cold cures. Usually .1 to 2 weight percent of catalyst is used.

In addition to the catalyst, promoters and accelerators such as N, N-dimethylaniline or 1% cobalt naphthenate in styrene can be employed during curing. Prior to curing fillers such as glass wool, asbestos, color pigments and the like can be added to the blend.

The examples presented herein are intended to be merely illustrative and are not intended to limit the scope of the claims. Certain ranges of components have been specified, and it is to be understood that those of skill in the art will be able to select the respective proportion from each range so as to produce compositions within the spirit and scope of the invention. The examples provide the guidelines to indicate to those of skill in the art the means and manner of component selection.

Example I 19.8 gm. (0.1 M) of $\alpha,\alpha$-dimethyl - trans - trans - dimethylmuconate and 9.3 gm. (8.4 ml.) (.15 M) of ethylene glycol were charged to a polymerization tube. The mixture was heated for 30 minutes at 200° C. while a stream of nitrogen was bubbled through. .15 ml. of tetraisopropyl titanate catalyst was added and the mixture heated for an additional three hours at 200° C. The mixture was then evacuated to <.1 mm. Hg for two hours. The product was a crystalline solid having an inherent viscosity ($\eta$inh.) of .49 (60/40 tetrachloroethylene/phenol at 100° F.) and a melting point of 173–176° C. When the polyester was heated above 220° C., it crosslinked.

Example II 19.8 gm. (0.1 M) $\alpha,\alpha'$-dimethyl-trans-trans-dimethylmuconate and 11 ml. (0.15 M) 1,3-propanediol (practical grade) were charged to a polymerization tube. The mixture was heated for 30 minutes at 200° C. while a stream of nitrogen was bubbled through. 0.15 ml. of tetraisopropyl titanate was added and heating and N₂ continued for 3 hours. The reaction was stopped and allowed to cool to room temperature (N₂ continued). The mixture was heated to 200° C. for 2 hours. The tube was evacuated to <0.1 mm. Hg for 2 hours. The product was a tough rubbery amorphous mass having a melting point of 75–80° C. When the mass was annealed for a few minutes, it became a crystalline solid having an inherent viscosity of .46.

5 gm. of the crystalline polyester was dissolved in 2.14 gm. of styrene. 0.036 gm. of benzoyl peroxide was added and the mixture warmed slightly to insure a complete solution. The mixture was transferred to a small mold of 1¾ inches diameter and cured for two hours at 100° C. The product was a hard, clear crosslinked disk.

Example III

In a polymerization tube 19.8 gm. (0.1 M) of $\alpha,\alpha'$-dimethyl-trans-trans-dimethylmuconate was added to 22.5 gm. (0.15 M) of triethylene glycol. The mixture was heated to 200° C., 0.15 ml. of tetraisopropyl titanate added and heating continued for three hours. The evolution of methyl alcohol was immediate. Approximately 80–90% of the methyl alcohol distilled off in the first 10 minutes of the reaction. The mixture cooled to a crystallized product overnight. The solid crystalline material was heated to 150° C. and melted. A 0.1 mm. Hg vacuum was pulled and the heating continued for 3 hours at 150° C., and continued for an additional two hours at 160° C. 26.32 gm. of crystalline polyester having a melting point of 160–162° C. and inherent viscosity of .29 was recovered.

To 20 gm. of the crystalline polyester, heated to 160° C. on a Woods metal bath was added 8.6 gm. (9.5 ml.) styrene. The mixture was removed from the bath and allowed to cool. 0.18 gm. of benzoyl peroxide was added with stirring to the cooling mixture. The mixture was placed in a mold and cured at 100° C. for two hours. The resulting crosslinked polyester was very stiff and clear.

Example IV 22.5 gm. (1.5 M) of freshly distilled triethylene glycol (Na treated) was added to 19.8 gm. (1 M) of $\alpha,\alpha'$-dimethyl-trans-trans-dimethylmuconate. 0.15 ml. of tetraisopropyl titanate was added and the mixture heated for two hours at 200° C. while nitrogen bubbled in. Methyl alcohol was evolved rapidly.

The polyester product was heated for one hour at 225° C. and 0.1 mm. Hg. Crosslinking occurred. The crosslinked product was quite rubbery and elastic.

Example V

The following reactants were charged to a polymerization tube:

| | |
|---|---|
| $\alpha,\alpha'$-dimethyl-trans,trans-dimethylmuconate (.04 M) gm | 7.92 |
| Dimethyl terephthalate (.36 M) gm | 70.0 |
| Ethylene glycol (.5 M+excess) ml | 30 |

The mixture was purged with nitrogen and heated to 200° C. with mixing for 30 minutes. .15 ml. of tetraisopropyl titanate was added and the mixture heated for an additional three hours at 200° C. 25 ml. of methyl alcohol was evolved. At the end of three hours a vacuum of .15 mm. Hg was pulled for two hrs. to remove volatiles. The product was 75.83 gm. of a brittle crystalline solid having a melting point of 228° C. and an inherent viscosity ($\eta$inh.) of .0746.

10 grams of the above product was placed in a vacuum tube at .08 mm. Hg for three hours at 200° C. The product was a crystalline polyester having a melting point of 240–242° C. and inherent viscosity of .192.

Example VI

The following reactants were charged to a polymerization tube:

| | |
|---|---|
| $\alpha,\alpha'$ - dimethyl - cis,cis - muconic acid (.0882 M) gm | 15 |
| Diethylene glycol (75% theoretical) gm | 7.0 |
| Ethylene glycol ml | 15 |
| Tetraisopropyl titanate drops | 10 |

The polymerization tube was placed in a heating block and the reaction began at 190° C. heating rapidly to 200° C. for four hours. The tube was fully immersed in the heating block for one additional hour, the temperature being allowed to rise to 220° C. A vacuum was pulled for 6 minutes. The mixture was then cooled, reheated and four minutes of vacuum pulled. The resulting product on cooling was a viscous liquid polyester having an inherent viscosity ($\eta$inh.) of .10.

Example VII 39.6 gm. (.2 M) of $\alpha,\alpha'$-dimethyl-trans,trans-dimethylmuconate and 22.8 gm. (22 cc.) (.3 M) of 1,2-propanediol were placed in a plyomerization tube and heated for 30 minutes while $N_2$ was bubbled through. .15 ml. of tetraisopropyl titanate was added and the mixture heated for an additional three hours. The $N_2$ was allowed to bubble through the cooled reaction mixture for 16 hours. The reaction mixture was heated to 200° C., .05 ml. additional catalyst added and heating continued for one hour. A total 15 ml. methyl alcohol was collected (18.5 ml. theoretical). The volatiles were distilled under vacuum. Final pressure was 0.045 mm. Hg at 200° C. after 3.5 hours. The product was 39.8 gm. of a brittle, glassy, noncrystalline solid (80% theoretical) having an inherent viscosity ($\eta$inh.) of .89.

25 gm. of the polyester product was added to 12.8 gm. of styrene with slight heating to dissolve the polyester, and .125 gm. of benzoyl peroxide added. The mixture was poured into a mold and cured for two hours at 100° C. The product was a hard, clear, yellow crosslinked polymer.

Example VIII

The following reactants were charged to a polymerization tube:

$\alpha,\alpha'$-dimethyl-trans,trans-dimethylmuconate (0.1 M) _____ gm__ 19.8
Ortho-phthalic anhydride (0.1 M) _____gm__ 14.8
Ethylene glycol (0.3 M)(16.65 ml.)_____gm__ 18.6

The tube was heated to 200° C. for 30 minutes while $N_2$ bubbled through. 0.15 ml. of tetraisopropyl titanate was added and the reaction continued for two hours. The reaction was stopped and the reaction mixture cooled to room temperature for 16 hours. The reaction was continued at 200° C. for three hours. Finally 0.1 mm. Hg vacuum was pulled on the system for three hours at 200° C. The polyester is noncrystalline, hard and brittle. Inherent viscosity was .15.

Twenty grams of the polyester was powdered and added to 8.6 gm. (9.5 cc.) of styrene and .145 gm. of benzoyl peroxide with stirring. The mixture was poured into a mold and cured for two hours at 100° C. The product was a hard, clear polymer.

Example IX

The following reactants were placed in a polymerization tube:

1,2-propanediol (88 ml.)(1.2 M) _____gm__ 91.5
Ortho-phthalic anhydride (.4 M) _____gm__ 59.3
$\alpha,\alpha'$-dimethyl-trans-trans-dimethylmuconate (.4 M)
gm__ 79.3

The reactants were heated for 30 minutes at 200° C. while $N_2$ bubbled through. 0.15 ml. of tetraisopropyl titanate catalyst was added and the reactants were heated for a total of 21 hours with 0.10 ml. of additional catalyst being added 4, 8 and 14 hours after initiation of the reaction. A vacuum was pulled for four hours at 200° C. giving a final pressure of .045 mm. Hg. The polyester product was 160 gm. (96.5% conversion) of an amber colored very viscous liquid having an inherent viscosity ($\eta$inh.) of .25.

Twenty-five grams of the polyester, 11.8 ml. of styrene (30 wt. %) and .18 gm. of benzoyl peroxide were stirred together until homogeneous. A portion was placed in two molds. One mold was cured for three hours at 100° C., the other for two hours. The results were substantially identical. The resulting polymer was clear, slightly yellow, and hard. The use of .1 g. azo-bis-isobutyronitrile in place of benzoyl peroxide produced a yellower polymer.

Example X

The following reactants were placed in a polymerization tube:

1,2-propanediol (22 ml.)(.3M) _____gm__ 22.8
Ortho-phthalic anhydride (.15 M) _____gm__ 22.9
$\alpha,\alpha'$ - dimethyl-trans,trans-dimethylmuconate (0.05 M) _____ gm__ 9.9

The tube was heated to 200° C. for 15 minutes with $N_2$ being bubbled through. 0.15 ml. of a tetraisopropyl titanate was added and the reaction continued for 2¾ hours. The tube was then put on a vacuum for one hour at 200° C. The resulting polyester was an amorphous solid having an inherent viscosity of .10.

Twenty-five gm. of the powdered polyester was added to 11.8 ml. of styrene (30 wt. percent) and .18 gm. of benzoyl peroxide added (.5 wt. percent). The mixture was poured into a mold and cured for two hours at 100° C. The product was a hard, clear, crosslinked polymer.

Example XI

The following reactants were placed in a polymerization tube:

Ethylene glycol (.815 M) _____ml__ 90.6
Ortho-phthalic anhydride (.339 M) _____gm__ 50
$\alpha,\alpha'$-Dimethyl-cis,cis-muconic acid (.339 M) _gm__ 57.6

The tube was heated to 205° C. for 20 minutes while $N_2$ bubbled through. 0.25 ml. tetraisopropyl titanate was added and reaction continued for 7 hours with $N_2$. A vacuum of .08 mm. Hg was pulled for 30 minutes. The recovered polymer was a viscous liquid having an inherent viscosity ($\eta$inh.) of .08.

Twenty-five grams of the polyester were dissolved in 12.8 ml. of styrene by heating, 0.125 gm. of benzoyl peroxide was added and the mixture placed in a mold and cured for one hour at 100° C. The crosslinked polymer was soft, flexible and slightly sticky.

Five grams of polyester were dissolved in 2.14 gm. (30 wt. percent) of styrene which was then mixed with .5 wt. percent benzoyl peroxide and one drop dimethyl aniline. The polymer was soft and flexible.

Five grams of the polyester were added to 2.14 gm. (2.70 ml.) of acrylonitrile after heating the polyester to 80° C. The polyester dissolved easily. One percent benzoyl peroxide (.0714 gm.) was added and the mixture stirred until it dissolved. The mixture was chilled for 16 hours in Dry Ice then warmed to room temperature and stirred until all ingredients were dissolved. One drop of dimethyl aniline was added and the mixture poured in a mold. The mixture was cured for one hour at 80° C. and one hour at 100° C. The product was a leathery, solid, crosslinked polymer.

Example XII

This example represents a control 38.8 gm. (.2 M) of dimethyl terephthalate and 15.0 gm. (16.7 ml.) (.242 M) of ethylene glycol are mixed in a polymerization tube at 200° C. After 20 minutes 0.28 ml. of tetraisopropyl titanate was added, and the heating continued for three hours. .1 mm. Hg vacuum was pulled for two hours. 34.70 gm. of low molecular weight polyester was recovered. 10 gm. of this polymer (60 mesh powder) was heated for three hours at 200° C. at .08 mm. Hg. The product had a melting point of 255–257° C. and inherent viscosity ($\eta$inh.) of .262.

All inherent viscosities were carried out as in Example

I. Examples I–VI show the production of crystalline polyesters and the crosslinking properties thereof. Examples VII–XI show amphorous polyester and the crosslinking thereof.

It has been observed that the trans,trans isomer polyesters have the best crosslinking properties. The cis,cis polyesters are the least active in crosslinking and the cis,trans are intermediate between the trans,trans and cis,cis polyesters.

A significant property of the $\alpha,\alpha'$-dimethylmuconic acid polyester is that the crosslinked polymers produced therefrom have relatively low mold shrinkage. This is shown by Table II where three ratios of $\alpha,\alpha'$-dimethylmuconic acid to saturated acid are compared with a maleic acid to saturated acid ratio of 50:50.

TABLE II

| Saturated acid:unsaturated acid mole ratio | | Styrene, wt. percent | Shrinkage, inch/inch |
|---|---|---|---|
| | Trans, trans DMMA | | |
| 1 | 50 | 50 | .004 |
| 2 | 50 | 50 | .003 |
| 3 | 75 | 25 | .013 |
| | Maleic | | |
| 4 | 50 | 50 | .016 |

The saturated acid employed in each example was terephthalic acid. The comparisons were made without regard to the diol employed. The use of different diols was found to have little significant effect on mold shrinkage. Diols employed include ethylene glycol, diethylene glycol, 1,3-propanediol and 1,2-propanediol. The polyesters of Examples 3 and 4 contain the same amount of unsaturation. Mold shrinkage is an important property where precision is the essential consideration. Table II shows that formulations using $\alpha,\alpha'$-dimethylmuconic acid are possible where mold shrinkage is almost non-existant.

The esters of the dimethylmuconic acid isomers can be produced by conventional methods as can the acyl halides and anhydrides thereof.

The invention claimed is:

1. A linear polyester comprising an organic dibasic component selected from the group consisting of $\alpha,\alpha'$-dimethyl-cis,cis-muconic acid, $\alpha,\alpha'$-dimethyl-cis,trans-muconic acid, $\alpha,\alpha'$-dimethyl-trans,trans-muconic acid, mixtures thereof with each other and with an organic diacid of the mixture

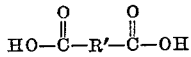

the diesters thereof, the dianhydrides thereof and the diacylhalides thereof where R' is an arylene radical having 1 to 20 carbon atoms and a diol component selected from the group consisting of ethylene glycol, diethylene glycol, 1,3-propanediol, 1,2-propanediol and mixtures thereof.

2. A linear polyester according to claim 1 wherein the diol component is ethylene glycol.
3. A linear polyester according to claim 1 wherein the diol component is 1,2-propanediol.
4. A linear polyester according to claim 1 having an inherent viscosity in the range of .05 to 2.0.
5. A linear polyester according to claim 1 wherein the diacid component is $\alpha,\alpha'$-dimethyl-trans,trans-muconic acid.
6. A linear polyester according to claim 1 wherein the diacid component is a mixture or $\alpha,\alpha'$-dimethyl-trans,trans-muconic acid and terephthalic acid.
7. A linear polyester according to claim 6 wherein the diol component is ethylene glycol.
8. A linear polyester according to claim 6 wherein the diol component is 1,3-propanediol.
9. A linear polyester according to claim 1 wherein the diacid component is a mixture of $\alpha,\alpha'$-dimethyl-trans,trans-muconic acid ortho-phthalic acid.
10. A linear polyester according to claim 1 wherein the diacid component is $\alpha,\alpha'$-dimethyl-cis,cis-muconic acid.
11. A crosslinked polymer comprising a linear polyester according to claim 1 and a crosslinking agent having a mole ratio of crosslinking agent to unsaturation of up to 5:1.
12. A crosslinked polymer according to claim 11 wherein the crosslinking agent is selected from the group consisting of styrene, butadiene, methyl methacrylate, vinylacetate, acrylonitrile, vinylidene chloride and isoprene.
13. A crosslinked polymer according to claim 12 wherein the mole ratio of crosslinking agent to unsaturation is in the range of 1:5 to 5:1.
14. A crosslinked polymer comprising a linear interpolyester according to claim 1.

References Cited

UNITED STATES PATENTS

| 2,857,303 | 10/1958 | Wilson | 260—861 |
| 2,957,837 | 11/1960 | Smith et al. | 260—861 |
| 3,160,679 | 12/1964 | Lew | 260—861 |
| 3,227,780 | 1/1966 | Brack | 260—861 |
| 3,236,787 | 2/1966 | Jonas | 260—2.5 |
| 3,305,514 | 2/1967 | Tiffan | 260—861 |
| 3,345,339 | 10/1967 | Parker et al. | 260—75 |

OTHER REFERENCES

Elvidge et al.: Polyene Acids, J. Chem. Soc., pages 1026–1028 (1952).

MURRAY TILLMAN, Primary Examiner.

JOHN T. GOOLKASIAN, Assistant Examiner.

U.S. Cl. X.R.

260—75, 486, 537